United States Patent [19]

Burrows et al.

[11] 4,276,868
[45] Jul. 7, 1981

[54] CAPACITOR DISCHARGE IGNITION SYSTEM HAVING AUTOMATIC SPARK ADVANCE

[75] Inventors: Thomas W. Burrows, West Allis; David T. Cavil, Menomonee Falls, both of Wis.

[73] Assignee: Outboard Marine Corporation, Waukegan, Ill.

[21] Appl. No.: 956,658

[22] Filed: Nov. 1, 1978

[51] Int. Cl.³ .................................................. F02D 3/06
[52] U.S. Cl. ................................. 123/602; 123/149 C
[58] Field of Search ........ 123/148 CC, 149 A, 149 C, 123/149 D, 149 F; 315/218, 209 SC, 209 CD

[56] References Cited

U.S. PATENT DOCUMENTS

| | | | |
|---|---|---|---|
| 3,500,809 | 3/1970 | Hohne et al. | 123/148 CC |
| 3,667,441 | 6/1972 | Cavil | 123/148 CC |
| 3,722,488 | 3/1973 | Swift et al. | 123/148 CC X |
| 4,036,201 | 7/1977 | Borson | 123/148 CC |
| 4,074,669 | 2/1978 | Cavil et al. | 123/148 CC |

*Primary Examiner*—Tony M. Argenbright
*Attorney, Agent, or Firm*—Michael, Best & Friedrich

[57] ABSTRACT

Disclosed herein is a capacitor discharge ignition system including a U-shaped magnetic core having a pair of legs, and a rotatable member including a magnet having arcuately spaced first and second pole shoes located for movement past the core legs, the second pole shoe having a length greater than the distance between the core legs and trailing the first pole shoe relative to a normal direction of rotation of the rotatable member. The ignition system also includes an ignition circuit including a charge capacitor, a switch for selectively discharging the capacitor to effect ignition, and charging, primary, and secondary windings wound on the core leg which is first approached by the magnet means during normal rotation of the rotatable member, which windings are responsive to each passage of the magnet past the core for sequentially charging the charge capacitor and operating the switch to discharge the capacitor to effect ignition so as to provide an advance in the time of ignition in response to increased rotational speed of the rotatable member. Also disclosed herein is a method of operating such an ignition system to provide automatic spark advance and to reduce engine kickback and prevent reverse engine operation.

11 Claims, 8 Drawing Figures

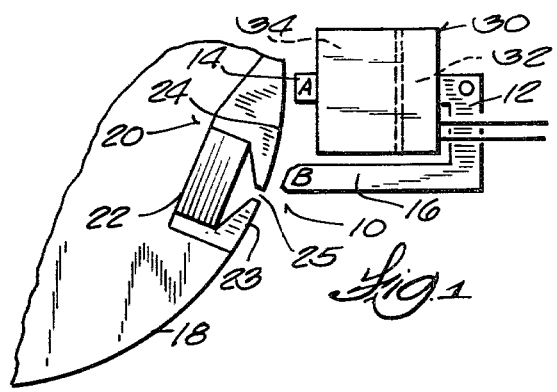
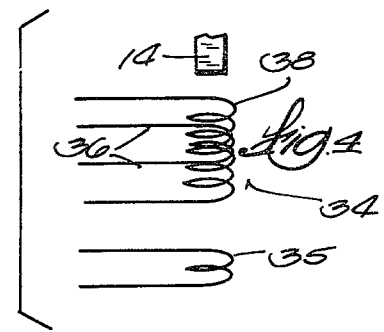
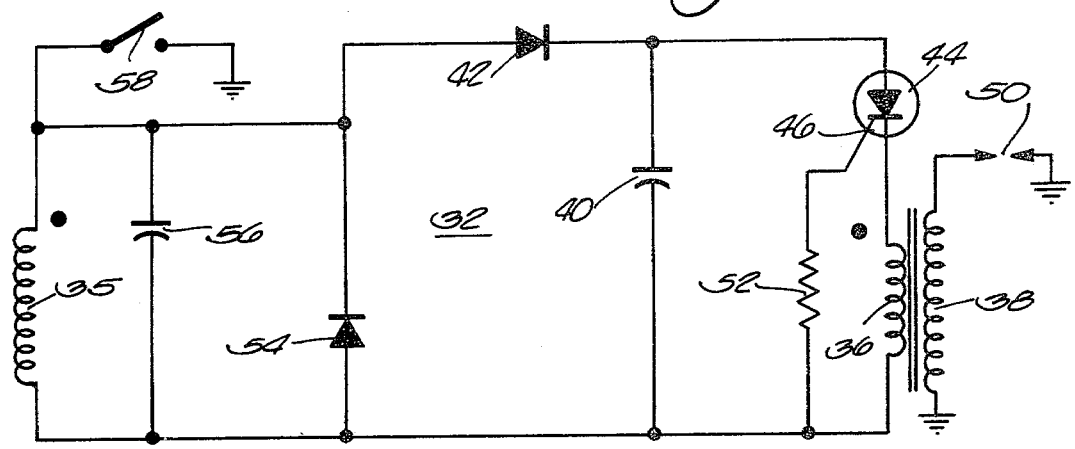
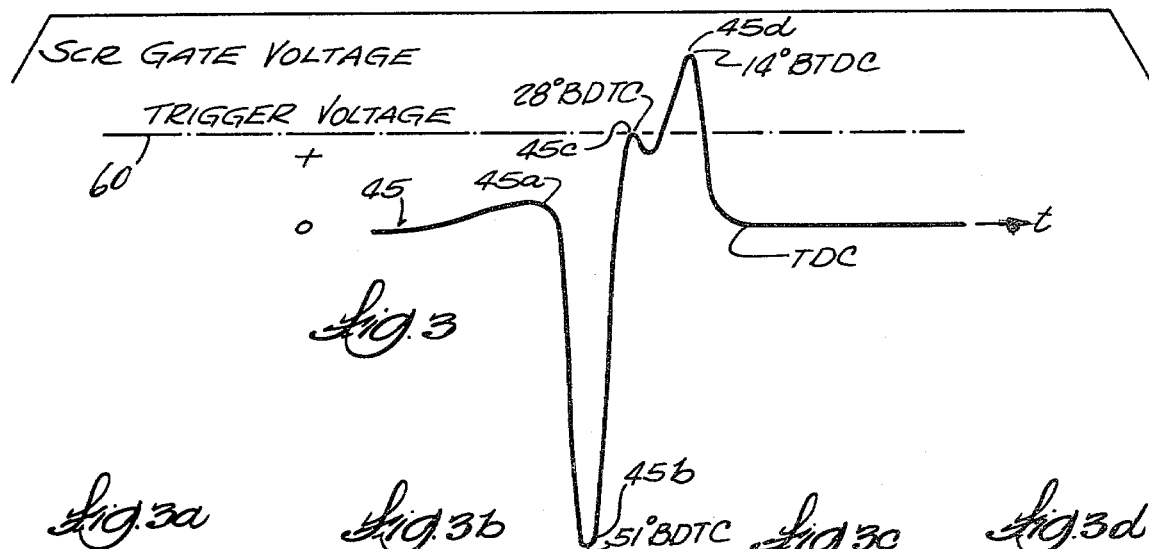
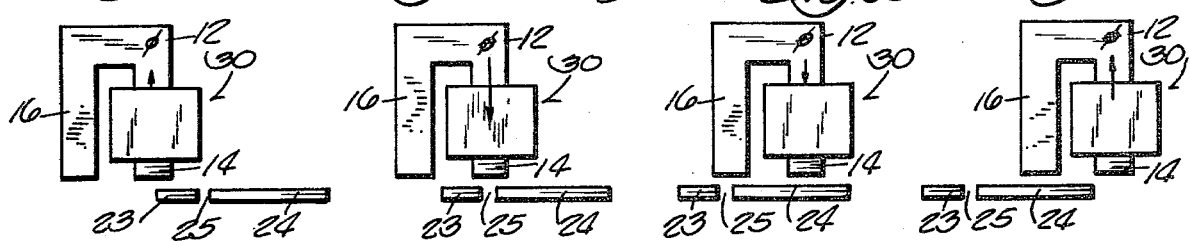

CAPACITOR DISCHARGE IGNITION SYSTEM HAVING AUTOMATIC SPARK ADVANCE

BACKGROUND OF THE INVENTION

The invention relates generally to ignition systems for internal combustion engines, and more particularly, to magneto powered capacitor discharge ignition systems including means for automatically providing spark advance in response to increasing engine speed and for preventing reverse engine operation. One such prior ignition system is disclosed in Cavil, U.S. Pat. No. 4,074,669, issued Feb. 21, 1978.

The invention also relates to ignition systems wherein a charge winding and a primary winding are wound on the same leg of a magnetic core positioned adjacent the path of a rotating magnet, and wherein a voltage is induced in the primary winding to sequentially charge a charge capacitor and trigger an ignition SCR in response to each rotation of the magnet past the magnetic core. One such prior ignition system is disclosed in Burson, U.S. Pat. No. 4,036,201, issued July 19, 1977. A capacitor discharge ignition system having sequential charging and triggering is also disclosed in Hohne, U.S. Pat. No. 3,500,809, issued Mar. 17, 1970.

SUMMARY OF THE INVENTION

The invention provides a capacitor discharge ignition system comprising a magnetic core having a pair of legs spaced apart at a first distance, a rotatable member including magnet means having first and second pole shoes spaced apart and located for movement past the spaced legs, the second pole shoe having a length greater than the first distance and trailing the first pole shoe relative to a normal direction of rotation of the rotatable member. The ignition system also includes an ignition circuit means including a charge capacitor, switch means for selectively discharging the capacitor to effect ignition, and coil means wound on the one of the legs which is first approached by the magnet means during normal rotation of the rotatable member and responsive to each passage of the magnet means past the core for sequentially charging the charge capacitor and operating the switch means to discharge the capacitor to effect ignition so as to provide an advance in the time of ignition in response to increased rotational speed of the rotatable member.

In one embodiment in accordance with the invention, the magnetic core is generally U-shaped, and the coil means comprises a charge winding, a primary winding, and a secondary winding wound on the one core leg.

In one embodiment in accordance with the invention, the charge winding is offset from the primary winding with respect to the axial length of the one core leg, and the primary winding and the secondary winding are coaxially wound on the one core leg.

In one embodiment in accordance with the invention, the charge winding is responsive to each passage of the magnetic means past the core to charge the charge capacitor and thereafter, the primary winding operates the switch means to discharge the capacitor through the primary winding to induce a voltage in the secondary winding to effect ignition and so as to provide an advance in the time of ignition when the rotational speed of the rotatable member increases above a predetermined lower speed.

In one embodiment in accordance with the invention, the ignition is adapted to operate an internal combustion engine in a forward direction when the rotatable member rotates in the normal direction, and the coil means is responsive to rotation of the rotatable member in a direction opposite to the normal direction to prevent ignition which allows operation of the engine in a reverse direction.

The invention also provides a method of operating an internal combustion engine ignition system to permit engine operation in the desired normal direction of rotation by effecting ignition so as to provide an advance in the time of ignition in response to increased engine speed above a predetermined lower speed, which ignition system includes a magnetic core having a pair of legs spaced apart at a first distance, a rotatable member which rotates in synchronism with the engine and includes magnet means having first and second pole shoes spaced apart and located for movement past the spaced legs, the second pole shoe having a length greater than the first distance and trailing the first pole shoe relative to a normal direction of rotation of the rotatable member, and ignition circuit means, including a charge capacitor, switch means for selectively discharging the capacitor to effect ignition, and coil means wound on the one of the legs which is first approached by the magnet means during normal rotation of the rotatable member, which method comprises the steps of rotation the magnet means in a normal direction toward the core to initially cause flux flow in one direction in the core to produce in the coil means a first pulse which, when the engine is operating in the normal direction, is of a suitable polarity but of insufficient magnitude to operate the switch means to effect ignition, thereafter continuing rotation of the magnet means in the normal direction to cause reversal of flux flow in the core to produce a second pulse, which, when the engine is operating in the normal direction, is of an opposite polarity which is ineffective to operate the switch means, and which is employed to charge the charge capacitor, thereafter continuing rotation of the magnet means in the normal direction to reduce the flux flow in the core to produce in the coil a third pulse which is of suitable polarity but of insufficient magnitude to operate the switch means to effect ignition when the engine is operating below the predetermined lower speed, and of sufficient magnitude to operate the switch to effect ignition when the engine is operating at a speed above the lower speed, and thereafter continuing rotation of the magnet means in the normal direction to reverse the direction of and increase the flux flow in the core to produce a fourth pulse of suitable polarity and of sufficient magnitude to operate the switch means to effect ignition when the engine is operating below the lower speed.

In accordance with an embodiment of the invention, production of the fourth pulse occurs a predetermined small amount in advance of top dead center so as to reduce engine kickback and facilitate engine starting.

In accordance with an embodiment of the invention, production of the second pulse occurs so far in advance of engine top dead center during normal engine operation that the corresponding pulse occurring during reverse engine rotation is so far after top center as to prevent reverse engine operation.

One of the principal features of the invention is the provision of a capacitor discharge ignition system for sequentially charging a charge capacitor and operating an ignition SCR to discharge the capacitor to effect ignition so as to provide an advance in the timing of the ignition in response to increased rotational speed of an engine.

Another of the principal features of the invention is the provision of such a capacitor discharge ignition system wherein the incidence of engine kickback is substantially reduced.

Another of the principal features of the invention is the provision of such a capacitor discharge ignition system wherein reverse engine operation is substantially prevented.

Another of the principal features of the invention is the provision of a method for operating such a capacitor discharge ignition to provide automatic spark advance and to reduce engine kickback and prevent reverse engine operation.

Other features and advantages of the embodiments of the invention will become known by reference to the following drawings, general description and claims.

FIG. 1 is a fragmentary schematic view of a capacitor discharge ignition system embodying various features of the invention.

FIG. 2 is a schematic view of an ignition circuit incorporated in the ignition system shown in FIG. 1.

FIG. 3 is a voltage wave form diagram of the voltage appearing at the gate of the ignition SCR of the ignition system shown in FIG. 1.

FIGS. 3a, 3b, 3c and 3d are diagrammatic views showing the magnet pole shoes and magnetic core of the ignition system of FIG. 1 in positions corresponding to points of interest labeled with subscripts a, b, c, and d in the voltage wave form shown in FIG. 3.

FIG. 4 is an enlarged and partially exploded schematic view of the coil means and core of the ignition system shown in FIG. 1.

Before explaining one of the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in FIG. 1 is a capacitor discharge ignition system 10 constructed in accordance with the invention to provide ignition or production of a spark to operate an internal combustion engine (not shown) in a normal direction so as to provide an advance in the time of ignition in response to increased engine speed, and so as to provide ignition timed to reduce engine kickback and to prevent reverse engine operation.

More particularly, as shown in the illustrated preferred construction, the ignition system 10 includes a generally U-shaped magnetic core 12 suitably constructed of magnetic material such as iron and including a pair of legs 14 and 16 spaced apart a first distance. The ignition system 10 also includes a rotatable member which, for example, can comprise a flywheel 18 of the internal combustion engine, and which includes magnet means 20, preferably in the form of a magnet 22 connected at its opposite ends to arcuately spaced leading and trailing pole shoes designated 23 and 24 respectively. The pole shoes 23 and 24 are spaced apart to define a relatively narrow gap 25 extending therebetween. Magnetization of the magnet is arranged so that a compass points from the trailing pole shoe 24 toward the leading pole shoe 23.

As shown in the illustrated construction, the pole shoes 23 and 24 are located for movement past the ends of the spaced core legs 14 and 16. The trailing pole shoe 24 has an arcuate length greater than the distance between the core legs 14 and 16 so as to shunt or reduce the magnetic flux flow in the core 12. The trailing pole shoe 24 trails the leading pole shoe 23 relative to a normal or clockwise direction of rotation of the rotatable member or flywheel 18.

As shown diagrammatically in FIG. 1 the ignition system 10 also includes ignition circuit means 30, generally represented by an outer box labeled 30 and which includes an ignition circuit generally designated 32 (See FIG. 2) including or connected to coil means, generally designated 34 (See FIG. 4). The coil means 34 is wound on the core leg 14 which is first approached by the magnet means 20 during normal rotation of the flywheel 18 and preferably includes a charge winding 35, and primary and secondary windings 36 and 38. The ignition circuit 32 and coil means 34 can be enclosed or held in position on the core leg 14 by a suitable container (not shown).

As shown in the schematic and partially exploded view of the coil means 34 in FIG. 4, the primary and secondary windings 36 and 38 are coaxially wound on the leg 14, and the charge winding 35, which is also wound on the leg 14, is offset from the primary and secondary windings, relative to the axial length of core leg 14. The charge winding 35 is offset or spaced from the primary and secondary windings so that a major portion of the flux which links the primary and secondary windings during capacitor discharge will not link the charge winding, and hence, so that the charge winding will not act as a shorting coil impairing generation of a high voltage output in the secondary winding. The charge winding 35 and the primary winding 36 are each wound around the core leg 14 so that the polarity of the voltage induced in each winding is the same with respect to the ends of the windings marked with a dot as shown in FIG. 2. For example, as the gap 25 passes adjacent the core leg 14, a positive voltage is simultaneously induced at the end of each of the charge and primary windings marked with a dot.

In addition to the windings of the coil means 34 already mentioned, the ignition circuit 32 also includes a charge capacitor 40 which is charged by unidirectional current flow through a blocking diode 42. Switch means, preferably in the form of a thyristor or an ignition SCR 44, selectively discharges the charge capacitor 40 through the primary winding 36 to induce a high voltage in the secondary winding 38 to cause a spark across the gap of a spark plug 50 (see FIG. 2). The ignition SCR 44 is rendered conductive or fired by application of a positive voltage trigger pulse or trigger current to the gate 46 of the SCR 44. The trigger pulse flows through a current limiting resistor 52 connected to the primary winding 36 as shown.

As illustrated, the ignition circuit 32 also includes a diode 54 which shunts positive voltages induced in the charge winding 35 and applied to the anode 55 of diode 54, and a capacitor 56 which suppresses transient pulses generated across the charge winding. A normally open kill switch 58 is also preferably connected in the ignition circuit 32 between the charge coil 35 and ground.

The construction of the coil means 34 and the ignition circuit 32 is similar to the construction of the corresponding components shown in the previously mentioned Burson, U.S. Pat. No. 4,036,201. The complete ignition system 10 disclosed herein, however, differs substantially from the ignition system described in Burson. More particularly, as it will be explained below, the ignition system 10 disclosed herein operates to provide the substantial advantages of spark advance, and reducing or eliminating the problems of engine kickback and reverse engine operation, which advantages are not disclosed or provided by the ignition system described in the Burson patent.

In order to explain the operation of the ignition system 10, reference will be made to FIG. 3 which illustrates a voltage wave form, generally designated 45, occurring in the primary winding, with the voltage polarity as it appears at the SCR gate 46. Thus, a positive voltage in the wave form 45 means that a positive voltage is applied to the SCR gate 46, while, at the same time, the voltage at the end of the primary winding shown with the dot would be negative. The magnitude of the voltage in the wave form 45 is a function of flywheel or engine speed. The variance in the shape of the voltage wave form 45 relative to change in time or change in degrees of angular distance before top dead center (BTDC) of the engine is a function of the construction of the magnet means 20 and of the position of the magnet means 20 relative to the position of the magnetic core 12.

More particularly, when the leading pole shoe 23 approaches the core leg 14 as shown in FIG. 3a, an inflow or change in magnetic flux flowing in the core 12 induces a first or small positive voltage pulse in the primary winding, designated 45a, as shown in the voltage wave form 45. This first positive voltage pulse 45a is of insufficient magnitude to fire the SCR 44. When the pole shoes 23 and 24 have rotated so that the gap 25 passes adjacent the core leg 14 as shown in FIG. 3b, an out flow of flux or reversal in flux flow in the core 12 occurs which induces a second or relatively high magnitude negative voltage pulse, designated 45b. At the same time this negative voltage pulse 45b is applied to the gate 46 which keeps the SCR 44 nonconductive, a positive voltage is generated at the end of the charge winding 35 marked with the dot and is effective to charge the charge capacitor 40.

When the magnet means 20 has rotated so that the trailing pole shoe 24 is positioned adjacent both the legs 14 and 16 of the magnetic core 12 as shown in FIG. 3c, the core 12 is shunted, resulting in a reduction of flux flow through the core 12 to provide a third or positive voltage pulse at the gate 46 illustrated as pulse 45c in the wave form 45. At an engine speed below a predetermined lower speed, for example, 600 rpm, this positive voltage pulse 45c has a magnitude just insufficient to trigger the ignition SCR 44, the trigger voltage of SCR 44 being shown by a dotted line labeled 60 in FIG. 3.

When the trailing pole shoe 24 passes the core leg 14 as shown in FIG. 3d, the magnetic flux flow reverses or changes direction and increases to induce a fourth or relatively higher magnitude positive voltage pulse 45d as shown in the wave form 45. The voltage pulse 45d has a polarity and magnitude sufficient to trigger the ignition SCR 44, rendering SCR 44 conductive so that capacitor 40 discharges through the primary winding 36 to effect ignition as previously described.

As noted, the magnitudes of the voltage pulses shown in wave form 45 increase with engine speed. As is apparent from the wave form 45 and SCR trigger voltage shown in FIG. 3, an advance in ignition timing occurs when the engine speed exceeds a predetermined lower speed, for example 600 rpm. Specifically, the ignition timing advances from, for example, 14° BTDC to 28° BTDC when the engine speed increases to where the positive voltage pulse 45c increases to a magnitude sufficient to trigger the SCR 44. Thus, the ignition system 10 operates so as to provide an advance in the time of ignition in response to increased rotational speed of the flywheel or engine, for example, in response to engine speed increasing above 600 rpm.

The amount of ignition advance is a function of the length of the trailing pole shoe 24. In order to obtain ignition advance the pole shoe 24 must be long enough to bridge the core legs 14 and 16 so that the voltage wave form 45 is distorted, i.e., so that the voltage pulse 45c exists and is displaced relative to the voltage pulse 45d. The voltage pulse 45d triggers the SCR at starting and slow engine speeds, while the voltage pulse 45c triggers the SCR and advances ignition when the engine speed increases above a predetermined lower speed, for example, 600 rpm. It should be noted that after the voltage pulse 45d, the voltage wave form 45 is shown going to zero, since during discharge of the charge capacitor the voltage at the SCR gate is of no further interest until the magnet means 20 again approaches and passes the magnetic core 12. If the voltage at the gate 46 were to be displayed, however, a sharp negative voltage pulse would be shown during the discharge of current from the capacitor through the primary winding 36.

Reference will again be made to FIG. 3 to explain how the ignition system 10 substantially reduces or eliminates the problem of engine kickback and reverse engine operation. For purposes of example only, as is shown in FIG. 3, the voltage pulse 45d which represents the point at which the ignition occurs when engine speed is, for example, below 600 rpm, occurs at approximately 14° before top dead center (BTDC). The voltage pulse 45c, which increases to a magnitude sufficient to trigger the SCR when the engine speed exceeds 600 rpm, occurs at approximately 28° BTDC. The voltage pulse 45b which corresponds to a voltage at which the charge capacitor 40 is charged, occurs at approximately 51° BTDC.

While minor advance in ignition timing (e.g., 1 or 2 degrees), may occur in response to increase of engine speed due to the voltage pulses of the wave form 45 having increased magnitude, it should be appreciated that occurrence of the voltage pulse 45c in the wave form 45 results in a substantial discrete advance in ignition timing, for example, from 14° to 28°, when the engine speed exceeds 600 rpm. This allows voltage pulse 45d to be selected to occur at a predetermined small amount of angular distance before top dead center, for example, 14° BTDC.

More particularly, since the ignition timing will be advanced by approximately 14° when the engine speed exceeds, for example, 600 rpm, the relative position of the magnet means 20 and the core 12 can be adjusted so that voltage pulse 45d and ignition at engine speeds below 600 rpm occurs at a relatively small amount of angular distance before top dead center for example, 14° BTDC, while ignition still occurs at a relatively large angular distance before top dead center for example, 28° BTDC, for normal engine operating speeds in excess of 600 rpm. This ignition occurring at a small angular distance for example 14° BTDC, during starting and at an engine speeds of below 600 rpm substantially reduces the occurrance of engine kickback, and also facilitates engine starting. Thus, the ignition system 10 provides ignition occurring at a relatively large angular distance before top dead center at higher engine rpm to provide substantially improved or optimum engine performance, and at the same time provides ignition occurring at a small angular distance before top dead center to assist engine starting and to reduce engine kickback problems.

With respect to preventing reverse engine operation, since the relative timing adjustment between the magnet means 20 and core 12 can be selected so that voltage pulse 45c of wave form 45 occurs at a relatively large angular distance of 28° BTDC, while still maintaining voltage pulse 45d and ignition at, for example 14° BTDC for engine starting, voltage pulse 45b also occurs at a corresponding large angular distance before top dead center, for example, 51° BTDC. If the internal combustion engine and flywheel 18 are driven in a reverse or counterclockwise direction, a voltage pulse of opposite polarity and corresponding to the voltage pulse 45d will trigger the SCR after charging of the charge capacitor at, for example, 51° after top dead center, or at a point in time so retarded that reverse engine operation will be prevented.

Accordingly, the ignition system 10 operates an internal combustion engine in a normal direction so as to provide an advance in the time of ignition in response to increased engine speed, and so as to provide ignition timed to facilitate engine starting and reduce engine kickback, and to prevent reverse engine operation.

It is to be understood that the invention is not to be confined to the particular method and construction and arrangement of parts herein illustrated and described, but embraces all such modified forms thereof as some within the scope of the following claims.

What is claimed is:

1. A capacitor discharge ignition system comprising a generally U-shaped magnetic core having a pair of legs spaced apart at a first distance, a rotatable member including magnet means having first and second pole shoes spaced apart and located for movement past said spaced legs, said second pole shoe having a length greater than said first distance and trailing said first pole shoe relative to a normal direction of rotation of said rotatable member, and ignition circuit means including a charge capacitor, switch means for selectively discharging said capacitor to effect ignition, and coil means wound on the one of said magnetic core legs which is first approached by said magnet means during normal rotation of said rotatable member and responsive to each passage of said magnet means past said core for sequentially charging said charge capacitor and operating said switch means to discharge said capacitor to effect ignition so as to provide a single discrete advance in the time of ignition distinct from gradual advance in the time of ignition resulting from increased rotational speed of said rotatable member, said single discrete advance occurring in response to increased rotational speed of said rotatable member above a predetermined lower speed.

2. A capacitor discharge ignition system in accordance with claim 1 wherein said coil means comprises a charge winding, a primary winding, and a secondary winding wound on said one core leg.

3. A capacitor discharge ignition system in accordance with claim 2 wherein said charge winding is offset from said primary winding with respect to the axial length of said one core leg, and wherein said primary winding and said secondary winding are coaxially wound on said one core leg.

4. A capacitor discharge ignition system in accordance with claim 3 wherein, responsive to each passage of said magnetic means past said core, said charge winding charges said charge capacitor and thereafter, said primary winding operates said switch means to discharge said capacitor through said primary winding to induce a voltage in said secondary winding to effect ignition and so as to provide an advance in the time of ignition when the rotational speed of said rotatable member increases above a predetermined lower speed.

5. A capacitor discharge ignition system in accordance with claim 1 wherein said ignition is adapted to operate an internal combustion engine in a forward direction when said rotatable member rotates in said normal direction, and wherein said coil means is responsive to rotation of said rotatable member in a direction opposite to said normal direction to prevent ignition which allows operation of the engine in a reverse direction.

6. A capacitor discharge ignition system including a generally U-shaped magnetic core having a pair of legs spaced apart at a first distance, a rotatable member including magnet means having first and second pole shoes arcuately spaced apart and located for movement past said spaced legs, said second pole shoe having an arcuate length greater than said first distance and trailing said first pole shoe relative to a normal direction of rotation of said rotatable member, and ignition circuit means including a charge capacitor, switch means for selectively discharging said capacitor to effect ignition, and coil means wound on the one of said magnetic core legs which is first approached by said magnet means during normal rotation of said rotatable member and responsive to each passage of said magnet means past said core for sequentially charging said charge capacitor and operating said switch means to discharge said capacitor to effect ignition so as to provide a single discrete advance in the time of ignition distinct from gradual advance in the time of ignition resulting from increased rotational speed of said rotatable member, said single discrete advance occurring in response to increase in rotational speed of said rotatable member above a predetermined lower speed, said coil means including a charge winding wound on said one leg, and a primary winding and a secondary winding coaxially wound on said one core leg and offset from said charge winding with respect to the axial length of said one core leg.

7. A capacitor discharge ignition system in accordance with claim 6 wherein said ignition is adapted to operate an internal combustion engine in a forward direction when said rotatable member rotates in said normal direction, and wherein said coil means is responsive to rotation of said rotatable member in a direction opposite to said normal direction to prevent ignition which allows operation of the engine in a reverse direction.

8. A method of operating an internal combustion engine ignition system to permit engine operation in the desired normal direction of rotation by effecting ignition so as to provide an advance in the time of ignition in response to increased engine speed above a predetermined lower speed, which ignition system includes a magnetic core having a pair of legs spaced apart at a first distance, a rotatable member which rotates in synchronism with the engine and includes magnet means having first and second pole shoes spaced apart and located for movement past said spaced legs, said second pole shoe having a length greater than said first distance and trailing said first pole shoe relative to a normal direction of rotation of said rotatable member, and ignition circuit means including a charge capacitor, switch means for selectively discharging said capacitor to effect ignition, and coil means wound on the one of said legs which is first approached by said magnet means during normal rotation of the rotatable member, which method comprises the steps of rotating the magnet means in a normal direction toward the core to initially cause flux flow in one direction in the core to produce in the coil means a first pulse which, when the engine is operating in the normal direction, is of a suitable polarity but of insufficient magnitude to operate the switch means to effect ignition, thereafter continuing rotation of said magnet means in the normal direction to cause reversal of flux flow in the core to produce a second pulse which, when the engine is operating in the normal direction, is of an opposite polarity which is ineffective to operate the switch means, and which is employed to charge said charge capacitor, thereafter continuing rotation of said magnet means in the normal direction to reduce the flux flow in the core to produce in the coil a third pulse which is of suitable polarity but of insufficient magnitude to operate the switch to effect ignition when the engine is operating below the predetermined lower speed, and thereafter continuing rotation of said magnet means in the normal direction to reverse the direction of and increase the flux flow in said core to produce a fourth pulse of suitable polarity and of sufficient magnitude to operate the switch means to effect ignition when the engine is operating below the lower speed.

9. A method in accordance with claim 8 wherein said rotating of the magnet means to produce said fourth pulse occurs a predetermined small amount of angular distance before top dead center so as to preclude engine kickback and facilitate engine starting.

10. A method in accordance with claim 8 wherein said rotating of the magnet means to produce said second pulse occurs so far in advance of engine top dead center during normal engine operation such that the corresponding pulse occurring during reverse engine rotation is so far after top center as to prevent reverse engine operation.

11. A method in accordance with claim 10 wherein said rotating of the magnet means to produce said fourth pulse occurs a predetermined small amount of angular distance before top dead center so as to preclude engine kickback and facilitate engine starting.

* * * * *